United States Patent [19]

Ruybal et al.

[11] Patent Number: 5,801,754
[45] Date of Patent: Sep. 1, 1998

[54] INTERACTIVE THEATER NETWORK SYSTEM

[75] Inventors: Edward James Ruybal, Arapahoe; Timothy Leo Rust, Highlands Ranch; Michael David Aisner, Boulder, all of Colo.

[73] Assignee: United Artists Theatre Circuit, Inc., Englewood, Colo.

[21] Appl. No.: 559,566

[22] Filed: Nov. 16, 1995

[51] Int. Cl.⁶ .................................................. H04N 7/14
[52] U.S. Cl. ............................. 348/13; 348/7; 348/16
[58] Field of Search .................................. 348/13, 7, 12, 348/722, 705, 470, 1, 16; 379/92.01, 92.03, 92.04

[56] References Cited

U.S. PATENT DOCUMENTS 4,974,252  11/1990  Osborne ................................. 379/92

*Primary Examiner*—Victor R. Kostak
*Attorney, Agent, or Firm*—Shook, Hardy & Bacon L.L.P.

[57] ABSTRACT

An interactive theater network system links a plurality of motion picture theater auditoriums so that live, interactive events can be conducted with theater audiences throughout the theater network. An origination site broadcasts information relating to the interactive event, and a plurality of network theater auditoriums are interactively linked with the origination site. Each network theater includes a full-motion picture projection system configured to receive the interactive event information from the origination site and present the information to the theater audiences. The interactive event information is transmitted from the origination site to the plurality of network theaters with a broadcast communication system. An audience response system provides interactive communication between the origination site and audience members from the network theaters. As part of the audience response system, a data collection system collects and processes data relating to the interactive event that is generated from the audience members. An interactive communication system also provides audio and video communications during the interactive event between audience members across the network and the origination site.

31 Claims, 3 Drawing Sheets

INTERACTIVE THEATER NETWORK SYSTEM

FIELD OF THE INVENTION

This invention relates to interactive communications and, more particularly, to a system for interactively linking a plurality of motion picture theaters to conduct live, interactive events.

BACKGROUND OF THE INVENTION

In recent years, there has been significant growth in the area of special event presentations such as seminars, multimedia business presentations, training, distance learning, business conferences, polling, etc. Because of the popularity and wide acceptance of such programs, many producers and presenters of these events now are reaching wider audiences beyond the location of the actual presentation. Satellite communications are widely used to broadcast presentations to audiences in geographically distant locations.

Public satellite networks began to appear in the mid-1980's to serve the growing market for live, satellite events. Most of these producers were affiliated with either production companies, broadcast television companies, or specialized satellite service companies. As the number of satellite receive sites increased over the years, several organizations attempted to market public satellite downlinking for multiple sites. In this connection, with the widespread availability of satellite sites, many public schools and libraries have received satellite dishes through programs such as the federally-funded Star Schools initiative. Similarly, many state government programs have installed satellite dishes in learning institutions, and numerous hospitals and medical clinics now have satellite capability.

In addition to such public sites, a growing number of private "business television" networks have emerged in the last decade. These private networks use permanently installed satellite equipment to broadcast programs to geographically distant sites owned by the particular businesses. As would be expected, these companies broadcast primarily to internal audiences.

In the above-described satellite networks, the satellite events employ one-way video technology from the broadcast site to the remote locations. Consequently, there is limited interaction between remote program participants and the broadcast site. However, in the past five years, there has been significant growth in the use of two-way video, or videoconferencing. These systems use compressed digital video signals that are typically transmitted by telephone lines using switched 56, T-1 or ISDN service. Today, most major corporations and many colleges and universities have installed videoconferencing equipment. These organizations use videoconferencing technology for events requiring only a few sites and from 1 to 20 attendees.

To provide increased real-time interaction between persons from geographically distant locations during special events, certain presenters use two-way satellite communication. For example, national "town hall" meetings have been produced to join people from geographically distant locations for discussions on political/social issues. Typically, in these events, audiences from a few select geographical locations are linked together by satellite, with each location having the capability of both transmitting and receiving satellite signals. In certain instances, "town hall" meetings and similar events have been conducted with audience response equipment such as individual keypads for survey/polling purposes.

While the above-described methods and systems for implementing multiple site events have experienced some success, these methods suffer from important disadvantages that limit their potential. For example, videoconferencing has limited application since this technology can serve only small groups of participants in a limited number of locations. Moreover, most national "town hall" meetings or similar events require both satellite uplink and downlink systems in each location to connect the limited groups of audiences. Obviously, if an increased number of locations is desired, the cost of producing these events becomes prohibitive due to the significant monetary expenditure for technical equipment and service. Additionally, these systems experience difficulties in serving large audiences in remote locations since television monitors typically are used to display the event. Obviously, because televisions are limited in screen size, they are not feasible for displaying event information to large audiences in auditoriums and the like.

SUMMARY OF THE INVENTION

In view of the foregoing, it is a primary object of the present invention to provide an interactive network system that links a plurality of large audiences to conduct live, interactive events.

In accomplishing this objective, another object of this invention is to interactively link a plurality of motion picture theater auditoriums so that large audiences can be accommodated at locations across the country.

Yet another object of this invention is to provide an interactive theater network system that utilizes full-motion picture projection technology so that audiences throughout the theater network can view interactive event information on large movie screens.

Still another object of this invention is to allow audiences from any network theater location to participate in the interactive event and allow this participation to be broadcast to all other theater locations within the network.

A related object of the present invention is to provide an interactive communication system that allows both audio and video communications to be generated from any theater location and broadcast to all other theater locations within the network.

Yet another object of this invention is to provide an interactive communication system that allows businesses or other entities to cost-effectively conduct live, interactive events nationwide or even worldwide.

These and other important aims and objectives are accomplished with the interactive theater network system of the present invention. The system links a plurality of motion picture theater auditoriums so that live, interactive events can be conducted with theater audiences throughout the theater network. The theater network system includes an origination site for broadcasting information relating to the interactive event, and a plurality of network theater auditoriums interactively linked with the origination site. Each of these network theaters includes a full-motion picture projection system configured to receive the interactive event information from the origination site and present the information to the theater audiences. The interactive event information is transmitted from the origination site to the plurality of network theaters with a broadcast communication system. The present invention also includes an audience response system that provides interactive communication between the origination site and audience members from the plurality of network theaters. A data collection system is provided as part of the audience response system to collect and process data relating to the interactive event that is generated from audience members in the plurality of theaters. Also, an interactive communication system provides audio and video communications during the interactive event between audience members across the network and the origination site.

BRIEF DESCRIPTION OF THE DRAWINGS

The various aspects of the invention are described in detail below, with reference to the drawings, in which.

DETAILED DESCRIPTION OF THE PREFERRED EMBODIMENT

Figure 1:
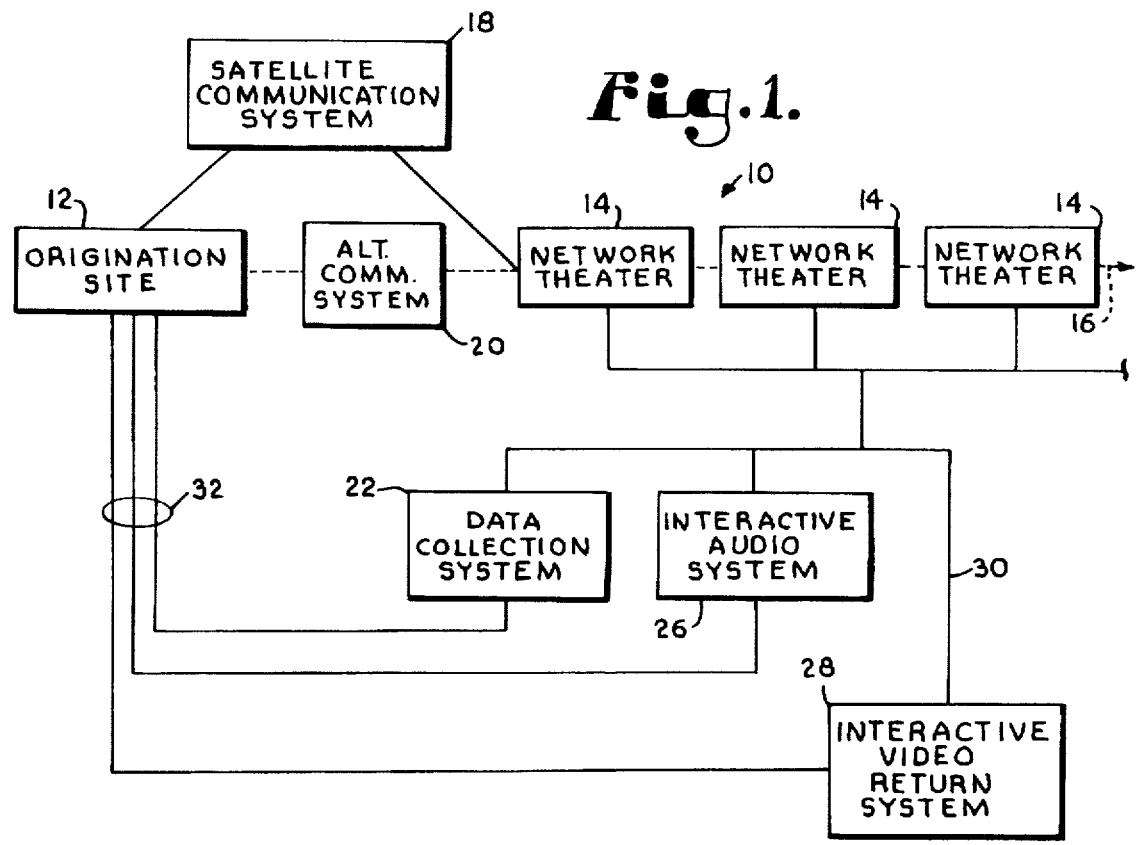
FIG. 1 is a block diagram illustrating the interactive theater network system according to the present invention.

Turning now to the drawings, an interactive theater network system for linking a plurality of motion picture theater auditoriums is broadly designated in FIG. 1 by the reference numeral 10. Interactive theater network system 10 of the present invention can be used to conduct live, interactive events by linking theater audiences from geographically distant regions located throughout the theater network. For example, theater network system 10 can be used to conduct interactive events such as business meetings, seminars, research sessions, training sessions, conferences, polling, sports viewing, "town hall" meetings, awards presentations, multi-media business presentations, interactive distance learning, etc. Thus, theater network system 10 has essentially unlimited applications in situations requiring interactive communication between large audiences from around the country and beyond.

Referring in more detail to FIG. 1, theater network system 10 includes an origination site 12 for broadcasting or transmitting the program information relating to a particular interactive event. Thus, for example, the origination site for a seminar could be a television studio or similarly-equipped location where the presenter conducts the seminar and conveys the presentation to theater audiences across theater network system 10. A plurality of network theaters 14 are shown in FIG. 1 that are interactively linked with origination site 12. As indicated in FIG. 1 by arrow 16, the present invention contemplates a significant number of network theaters within interactive theater network system 10 of the present invention. Each of the network theaters 14 includes a full-motion picture projection system configured to receive the interactive event information from origination site 12 and present the information to theater audiences. Thus, unlike videoconferencing technology which conferences small groups in a few locations on closed-circuit television, theater network system 10 interactively links virtually hundreds of locations housing large audiences for a single interactive event.

In the preferred embodiment of the present invention, a satellite communication system 18 is utilized to interactively link origination site 12 with the plurality of network theaters 14. In this case, origination site 12 employs a satellite uplink system to broadcast the program information. Satellite transmissions from origination site 12 are received by a designated satellite orbiting Earth and relayed to the selected network theaters 14 within theater network system 10. Each network theater 14 is equipped with a satellite downlink system so that the program information broadcast from origination site 12 can be received and displayed to the theater audiences.

For the purpose of securing transmissions, satellite communication system 18 includes an encryption system that encodes event transmissions at the origination site so that only authorized network theaters 14 have access to the event transmissions. In the preferred embodiment, a computer interface communicates with the encryption system at the origination site so that event presenters can designate particular theaters for receipt of the event information. Each network theater location 14 includes a decoding device for decoding the encrypted satellite signals. A suitable satellite communication system for purposes of the present invention is produced by Scientific Atlanta and includes B-MAC encoding technology.

FIG. 1 also illustrates an alternative communication system 20 for interactively linking origination site 12 and network theaters 14. Alternative communication system 20 can comprise a fiber optic communication system or a microwave communication system as alternatives to satellite communication. For example, with a fiber optic communication system, fiber optic connections are run from the network theaters to the central office of a local telephone company. The signals are transmitted across fiber optic telephone lines to the local central office in the location of the origination site. Similar fiber optic connections exist between the origination site and the local central office so that fiber optic signals can be both transmitted and received by the origination site. Thus, although the present invention contemplates the use of a satellite communication system as the preferred method of communication, any method of communication having the capability of transmitting signals containing video and audio information can be utilized in accordance with the present invention to interactively link a plurality of network theaters.

Figure 3:
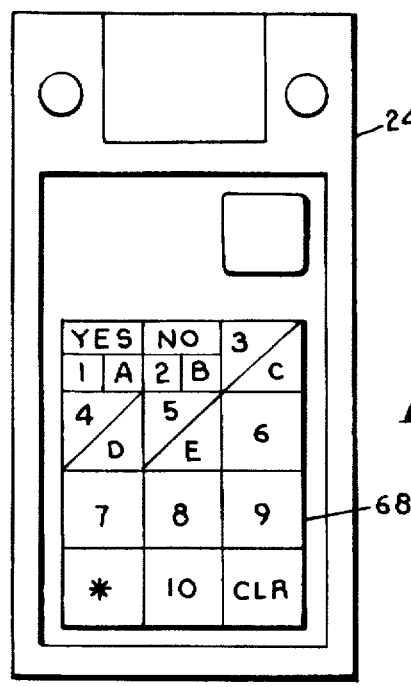
FIG. 3 is a diagram illustrating the wireless keypads used in connection with the data collection system of the interactive theater network system.

An important aspect of the present invention is the ability to provide audience response at any or all of the particular theaters in theater network system 10. The audience response system provided with the present invention allows for interactive communication between the origination site and audience members from the plurality of network theaters, as well as communication between audience members from different theater audiences within the theater network. As illustrated in FIG. 1, a data collection system 22 is used to collect and process data relating to the interactive event that is generated from audience members in the plurality of theaters. For example, in research sessions or other events where audience participation is desired, audience members are equipped with wireless keypads 24, as best illustrated in FIG. 3, to generate responsive data relating to the particular interactive event. Further details of data collection system 22 are described below in connection with FIG. 4.

Theater network system 10 also includes an interactive audio system 26 that provides two-way audio communications between audience members from multiple sites in the plurality of network theaters, and between remote audience members and the origination site while the interactive event takes place. Thus, in accordance with the present invention, an audience member participating in the interactive event at a geographically distant network theater location can communicate with the presenter at the origination site. Moreover, this audience communication is relayed to all other participating theaters in the theater network system.

To further enhance the interactive communication within theater network system 10 of the present invention, an interactive video return system 28 is provided. Video return system 28 supplies signals containing video information generated from any of the network theater locations and communicates these video information signals to origination site 12. These video information signals are then broadcast by origination site 12 in real-time to the other network theaters during the interactive event. This is accomplished in the present instance by equipping each network theater 14 with a video camera so that video images of participants can be taken at any network theater location within theater network system 10. In one implementation of the present invention, the video return system 28 utilizes a still-image video system that supplies still-image video signals from any of the network theaters and communicates the signals to the origination site for broadcast to all network theater locations. These still-image video signals can be produced by utilizing a video camera, such as a conventional camcorder, in conjunction with a special still-image phone, such as the AT&T Picasso Still-Image phone. In an alternative implementation, if upgraded telephone lines are available, video return system 28 can supply full-motion video signals of participants at any of the network theater locations and communicate these full-motion video signals to the origination site.

As shown in FIG. 1, the plurality of network theaters 14 are interconnected to audience response systems 22, 26 and 28 via data lines 30. In a similar fashion, systems 22, 26 and 28 communicate with origination site 12 via data lines 32. In the present embodiment, data lines 30 and 32 comprise conventional telephone lines, although the data lines could comprise upgraded telephone lines such as ISDN lines.

A highly desirable feature of interactive theater network system 10 is the ability to accommodate large audiences in many theater locations nationwide or even worldwide. The venue of motion picture theaters is uniquely capable of accommodating large numbers of participants. For example, motion picture theaters typically have large auditoriums with comfortable, long-duration seating and clear sight lines to large movie screens that display the interactive event information. Moreover, the network theater locations 14 included in theater network system 10 employ the highest quality projection equipment available as described in further detail below. Also, movie theaters are already equipped with outstanding sound systems and provide limited distraction environments, unlike hotel conference rooms or other similar meeting places.

Another important advantage of theater network system 10 is the capability for presenters to select which markets to include in the network system. For example, a large corporation utilizing theater network system 10 of the present invention can essentially customize a theater network by selecting its corporate headquarters as the origination site and selecting network theaters in geographic locations where additional corporate facilities are located. Thus, the present invention provides true flexibility in creating interactive programs by allowing presenters to select from a few network locations to literally hundreds of locations.

Figure 2:
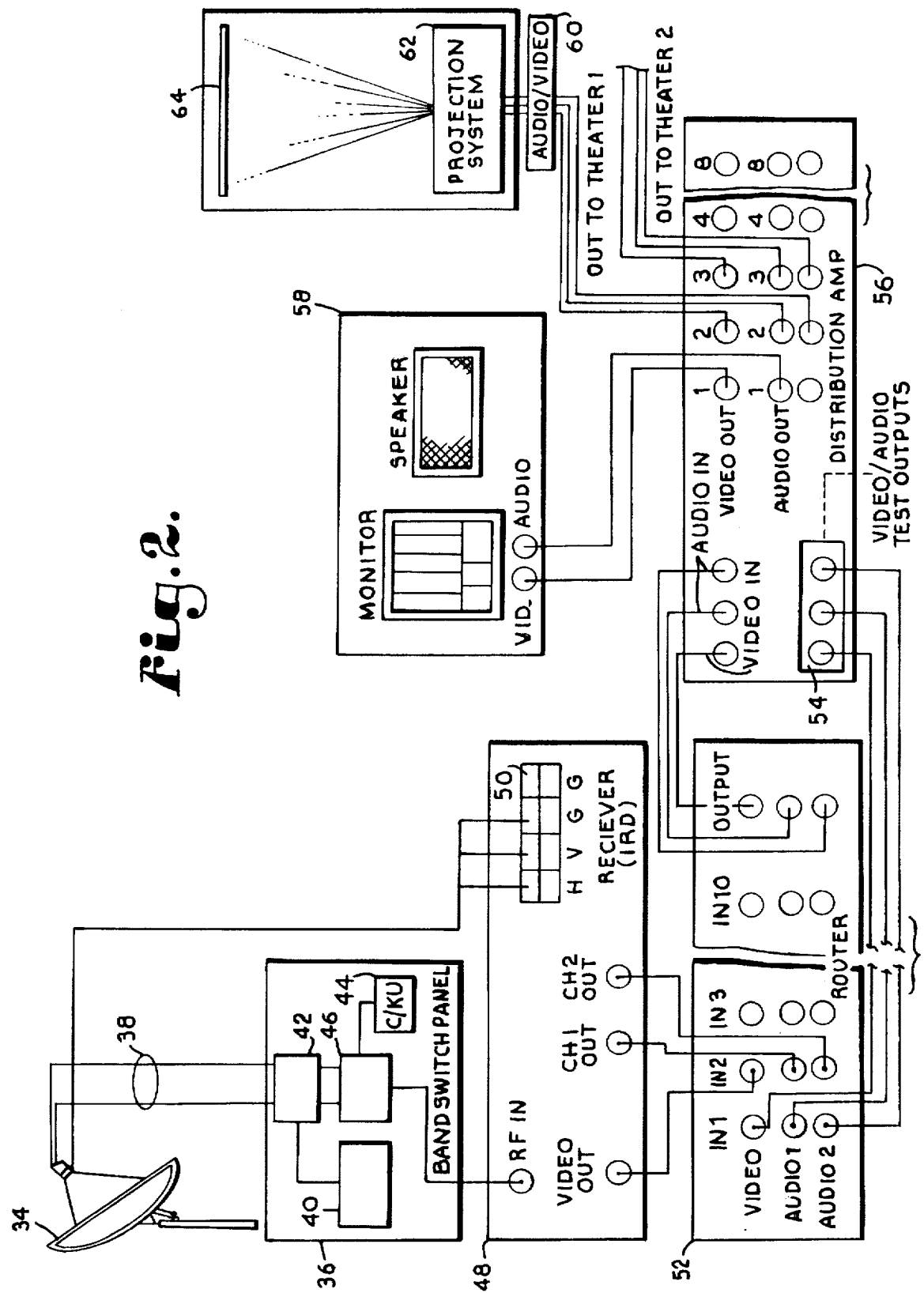
FIG. 2 is a schematic diagram illustrating the technical components used in the network theater locations of the interactive theater network system shown in FIG. 1.

FIG. 2 illustrates the components utilized at each network theater location to present the interactive event information to theater audiences. Each theater location is equipped with a satellite dish 34 for receiving satellite transmissions from the origination site. The satellite signals are fed into a band switch panel 36 via lines 38. Band switch panel 36 includes a power supply 40 connected to a power block 42 which supplies power to a low noise block (LNB) associated with satellite dish 34. A toggle switch 44 in band switch panel 36 allows satellite dish 34 to receive either C or KU band signals. Toggle switch 44 is connected to band switch 46 which allows the selected C or KU band signals to be routed to an integrated receiver/decoder 48.

As can be seen in FIG. 2, the satellite signals are transmitted from band switch panel 36 to the "RF IN" input of receiver 48. Receiver 48 then produces VIDEO OUT signals and AUDIO OUT signals via channel 1 (CH 1) and channel 2 (CH 2) outputs. Additionally, receiver 48 includes an antenna polarity control 50 that controls the signal polarity for satellite dish 34. Theater network system 10 of the present invention also includes a satellite redundancy feature to permit interactive communication when satellite transmissions are degraded. For example, during certain times of the year, the relative positioning of the Sun, the satellite, and the Earth results in an increased level of microwave radiation received from the Sun. This radiation essentially blocks or seriously degrades satellite signals. During these times, theater network system 10 utilizes live audio signals via telephone lines to supply uninterrupted communication between origination site 12 and the plurality of network theaters. Such occurrences typically last only several minutes at any particular geographic location.

Still referring to FIG. 2, the output signals from receiver 48 are communicated to a router 52. In addition to receiving satellite signals, router 52 receives any other signal containing video and audio information such as signals from fiber optics, high definition television, laser disc, etc. As shown in FIG. 2, the VIDEO OUT output from receiver 48 is connected to the VIDEO IN2 input of router 52, and the CH 1 and CH 2 audio outputs from receiver 48 are received by the AUDIO 1 and 2 inputs of input IN2. The IN1 video and audio inputs are connected to a video/audio test output generator 54 shown as part of distribution amplifier 56 in FIG. 2. Router 52 includes a number of video and audio inputs, and as shown in FIG. 2, up to ten inputs.

The output signals from router 52 are received by the AUDIO IN and VIDEO IN inputs of distribution amplifier 56. Distribution amplifier 56 then distributes the audio and video output signals to the particular theater auditoriums selected to receive and display the interactive event information. As shown in FIG. 2, distribution amplifier 56 has up to eight audio and video outputs, although this number is only illustrative. As can be seen, the VIDEO OUT 1 and AUDIO OUT 1 outputs of distribution amplifier 56 are received by a projection booth monitor and speaker 58 so that projection booth personnel can monitor the interactive event information displayed in the theater auditoriums.

As illustrated in FIG. 2, VIDEO OUTPUT 2 and AUDIO OUTPUT 2 of distribution amplifier 56 are routed to Theater 1 of the particular network theater. These signals are run to an audio/video wall panel 60 located in the projection booth of the theater. A projection system 62 is then connected to audio/video wall panel 60 so that projection system 62 can display the interactive event information on movie screen 64.

A highly advantageous feature of theater network system 10 is the capability of presenting high-resolution, full-motion video projection images on large movie screens to theater audiences. This capability is far superior to existing systems that utilize television technology for displaying broadcasts to conference participants. In the illustrated embodiment, a Hughes/JVC Model 320 video projector is used to display the interactive event information to theater audiences. It will be appreciated that other state-of-the-art systems employing high quality video projection technology (such as light valve or digital micro-mirror device (DMD) technology) can be used in accordance with the present invention. In most cases, the projection system utilizes a line doubler such as the Faroudja System LD100 to provide a higher resolution picture on the movie screens. Generally, any NTSC signal runs through the line doubler before it is received by the video projector. However, high definition television signals run directly into the projector without the use of the line doubler. This is also the case for most on-site computer signals.

Figure 4:
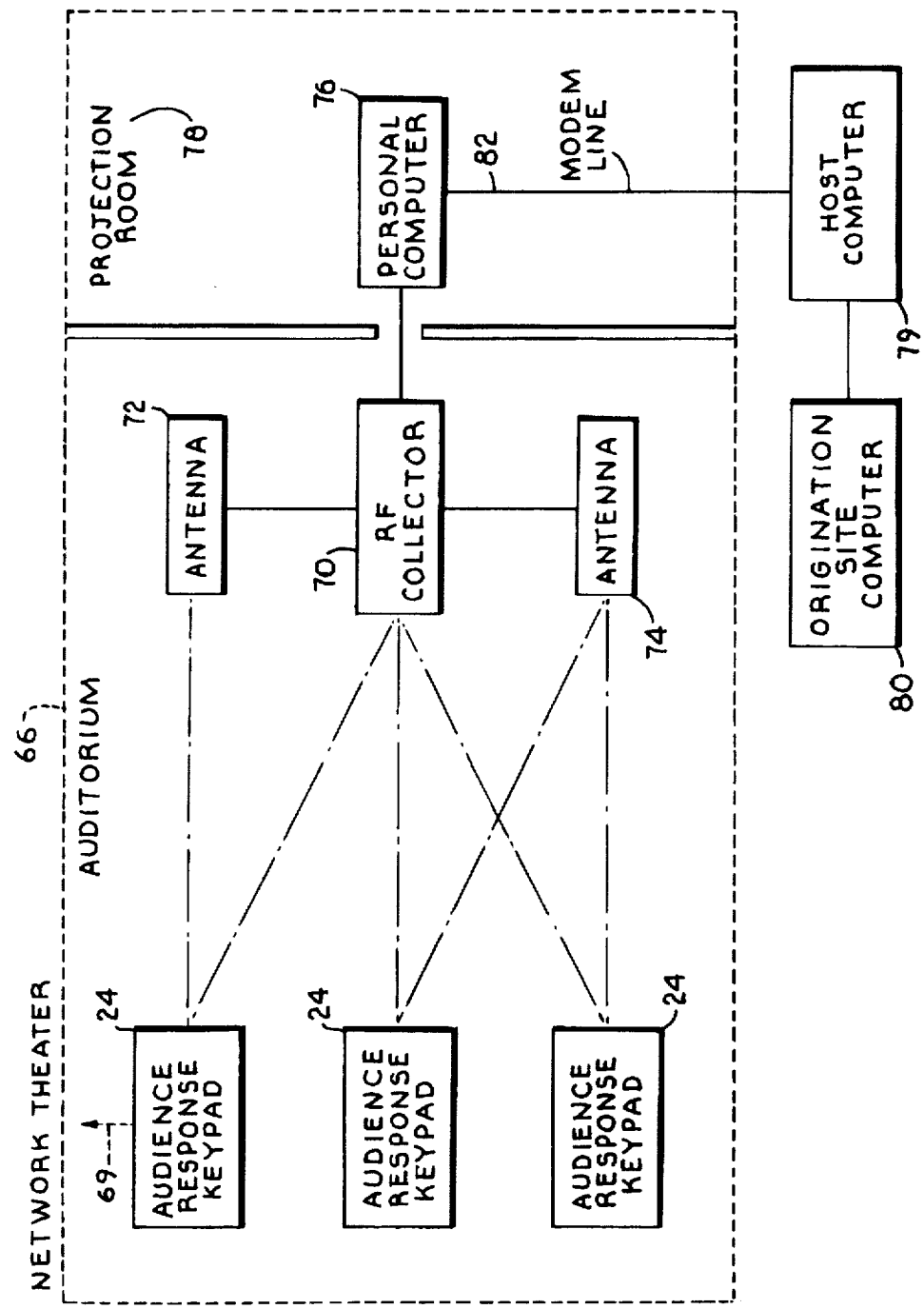
FIG. 4 is a block diagram illustrating the components used to collect data from audience members in network theaters according to the present invention.

FIG. 4 illustrates the manner in which data is collected from audience members in accordance with theater network system 10. Within each network theater auditorium 66, audience members are supplied with audience response keypads 24. As shown in FIG. 3, audience response keypads 24 include an alphanumeric keypad 68 so that audience members can key-in data at appropriate times during an interactive event. While FIG. 4 only shows three audience response keypads 24, it should be understood that large numbers of keypads 24 can be used for data collection as represented by arrow 69. The radio frequency (RF) signals transmitted by audience response keypads 24 are collected by an RF collector 70 located substantially near the back wall of each theater auditorium. To avoid missing any RF signals within the theater auditorium, antennas 72 and 74 are spaced apart from RF collector 70 to capture all signals. Suitable audience response keypads and RF collector equipment include Model CRS1200 cordless keypads and CRS950 interfaces produced by the Fleetwood Furniture Company of Holland, Mich.

The signals received by RF collector 70 are processed and transmitted to a personal computer 76 stationed in a projection booth 78 of each network theater. A suitable personal computer is an IBM PS/2 Model 65 or similarly-equipped PC. Personal computer 76 processes the data generated from audience members related to the interactive event and transmits the data to a host computer 79.. The host computer 79 accepts data from each participating network theater location and transmits data for each theater to an origination site computer 80 via standard modem line 82.

In keeping with the ability to serve large audiences across a large number of network theaters, theater network system 10 in the illustrative embodiment can accept data from up to 250 keypads per network theater location in a single network. Thus, up to 250 keypad signals are received, processed, and communicated to the origination site for substantially instantaneous tabulation of results. These tabulated results are then broadcast by origination site 12 to the entire theater network. In instances where only a single theater is used as opposed to a network of theaters, system 10 can accept up to 1000 keypad signals for a single location. Furthermore, in situations where more than 250 keypad signals are required per network theater location in a networking situation, theater network system 10 can accept more than 250 keypad signals per location and store these signals for later processing and tabulation of results.

Another desirable feature of theater network system 10 according to the present invention is the capability of allowing a client to monitor a program such as a blind research session from its corporate offices. For example, if a corporation chooses to conduct training or research sessions with a large number of corporate employees across the country, corporate management can monitor the national research session with a special theater arrangement. Specifically, instead of displaying results to all participants, the collected and processed data can be tabulated and sent directly to the corporate offices. In this situation, corporate management accepts the satellite signals from the origination site similar to all network theater locations, and the tabulated results from collected data is transmitted via modem only to the corporate site.

For real-time data collection during interactive events, each computer at the network theater locations operates in a "dummy" mode for data collection only. Each theater computer communicates with host computer 79 which then transmits to the origination site computer 80 via modem line. The origination site computer 80 is used to display the text of questions or other data used for the particular interactive event. Origination site computer 80 lists particular questions, and also informs the remote computers in the network theater locations to accept data from wireless keypads 24. Then, for the next question or text display, origination site computer 80 directs the next question to be displayed, and also directs the remote computers to stop collecting data for the previous question, send the collected data for the previous question to origination site computer 80, and begin collecting data for the next question. The text of each question can also be displayed on the screen to the audience participants along with the tabulated results. Additionally, incorrect answers input by particular users will be noted as well as the identification of users that do not respond.

As discussed above, a significant aspect of the interactive nature of theater network system 10 is the ability to provide two-way audio and video communications across the theater network. In the illustrated embodiment, a modified phone bridging system is utilized to provide the video capability. This is due to the fact that video phones can only interact in a point-to-point environment. If the bridge lines are open to all locations, when one remote phone attempts to communicate with the origination site, the communications are also received by the phones at the other remote locations. Because modems are involved, significant problems occur as each remote phone line receives the modem connect signals along with the video signals that are only intended for the origination site. To overcome these problems, the present invention stations an operator at the modified phone bridge to patch particular callers through to the origination site to provide the audio and still-image video signals. When the particular phone location is connected to the origination site, all other video and audio transmission systems from the other remote locations are disabled. The phone bridge operator is directed by personnel involved with operating the particular interactive event regarding which particular network theater to patch into the origination site at a given time.

In keeping with the invention, the tabulated data processed by data collection system 22 can be provided to clients in an expeditious manner in a variety of formats such as hardcopy, modem transmission, or computer disk. For example, the data files can be provided in an ASCII format, an RF file, and an Excel format. Generally, the tabulated data is displayed in a column/row format, with each column representing responses to a particular question and each row representing the particular keypad that provided responses.

A desirable feature related to data collection is the ability to support ad hoc questioning. Typically, all of the questions for a research session, for example, are pre-programmed. However, theater network system 10 provides the capability of soliciting responses to additional questions on an ad hoc basis and storing both the collected data and the text of the ad hoc questions.

Another important advantage of theater network system 10 relates to market pricing. The present invention offers significant cost savings advantages, since it would cost a client renting the equipment necessary to provide a similar network system for interactive events a significantly greater amount than is required by users of theater network system 10.

In addition to providing interactive research sessions, business meetings, etc., theater network system 10 can be used for other important applications. For example, theater network system 10 can be used to significantly assist in the production and distribution of motion picture films. Typically, a motion picture is filmed using both film and videotape. The film and the videotape include time codes interspersed throughout the frames that are synchronized between the film and the videotape. During the editing process, motion picture companies normally edit the videotape first, and then edit the film based on the synchronized time codes placed on both the film and the videotape. Once the film is edited, it is provided to test screen sites and screened by audiences for potential changes or general approval prior to wide distribution. Both the film and the videotape are edited as many times as required to complete the film to the satisfaction of those involved with the production.

Theater network system 10 can significantly reduce the time and procedures involved in film production. In connection with the present invention, the videotape used in filming the motion picture is converted to high-definition signals or other video formats. These video files are then transmitted across the theater network system via satellite or fiber-optic lines to select groups of theater audiences. These theater audiences can screen the video files and provide responses relating to the movie with the interactive audience response system of the present invention. Then, the motion picture company need only edit the videotape version following audience screening and, if necessary, rescreen the videotape as necessary using the theater network system without editing the original film version. Once the video format is in the desired condition, the film can then be edited only once and then sent out for wide distribution to movie theaters. This capability certainly provides a tremendous savings in both time and costs in relation to motion picture production.

As is evident from the foregoing description, the theater network system of the present invention allows a plurality of motion picture theater auditoriums to be interactively linked so that live, interactive events can be conducted with large theater audiences throughout the theater network. The present invention provides full-motion picture projection capability to the theater audiences across the theater network, and allows real-time audience participation through data collection, audio communication, and video communication.

While this invention has been described with an emphasis upon a preferred embodiment, it will be understood by those of ordinary skill in the art that variations of the preferred embodiment may be used and that it is intended that the invention may be practiced otherwise than as specifically described herein. Accordingly, this invention includes all modifications encompassed within the spirit and scope of the invention as defined by the following claims.

We claim:

1. An interactive theater network system for linking a plurality of motion picture theater auditoriums to conduct live, interactive events with theater audiences throughout the theater network, the theater network system comprising:

an origination site for broadcasting information relating to the interactive event;

a plurality of network theater auditoriums interactively linked with the origination site, each of the theaters including a full-motion picture projection system configured to receive the interactive event information from the origination site and present the information to theater audiences;

a broadcast communication system for transmitting the interactive event information from the origination site to the plurality of network theaters; and an audience response system for providing interactive communication between the origination site and audience members from the plurality of network theaters, the audience response system including data collection means for collecting and processing data relating to the interactive event generated from audience members in the plurality of theaters, and interactive communication means for providing two-way audio and video communications during the interactive event between audience members from multiple sites in the plurality of network theaters and between audience members and the origination site.

2. The interactive theater network system as defined in claim 1 wherein the broadcast communication system comprises a satellite communication system.

3. The interactive theater network system as defined in claim 2 wherein the satellite communication system includes a satellite transmission device located at the origination site and satellite receiving devices located at the plurality of network theaters for receiving the interactive event information from the satellite transmission device.

4. The interactive theater network system as defined in claim 3 wherein the satellite communication system includes encryption means for encoding event transmissions so that only authorized network theaters have access to the event transmissions.

5. The interactive theater network system as defined in claim 1 wherein the broadcast communication system transmits information via fiber optic communication or microwave communication.

6. The interactive theater network system as defined in claim 1 wherein the interactive events include research sessions, business meetings, seminars, multi-media presentations, training, and conferences.

7. The interactive theater network system as defined in claim 1 wherein the data collection means includes wireless keypads provided to theater audience members for generating response data relating to the interactive event information, and RF collection means for receiving RF signals generated by the wireless keypads during data collection.

8. The interactive theater network system as defined in claim 7 wherein the data collection means further includes computer means for receiving the data generated by the audience members, processing the collected data, and communicating the processed data in substantially instantaneous time to the origination site for broadcast to the plurality of network theaters.

9. The interactive theater network system as defined in claim 1 wherein the interactive communication means comprises:

audio communication means for providing two-way audio communication between audience members from multiple sites in the plurality of network theaters and between audience members and the origination site; and video communication means for supplying signals containing video information from any of the plurality of network theaters and communicating said signals to the origination site so that said signals can be broadcast to the plurality of network theaters during the interactive event.

10. The interactive theater network system as defined in claim 9 wherein the video communication means comprise still-image video means for supplying still-image video signals generated from any of the plurality of network theaters to the origination site.

11. The interactive theater network system as defined in claim 9 wherein the video communication means comprises interactive full-motion video means for supplying full-motion video signals generated from any of the plurality of network theaters and communicating the full-motion video signals to the origination site.

12. An interactive theater network system for linking a plurality of motion picture theater auditoriums to conduct live, interactive events with theater audiences throughout the theater network, the theater network system comprising:

an origination site for broadcasting information relating to the interactive event;

a plurality of network theater auditoriums interactively linked with the origination site, each of the theaters including a full-motion picture projection system configured to receive the interactive event information from the origination site and present the information to theater audiences;

a satellite communication system for communicating the interactive event information from the origination site to the plurality of network theaters;

a data collection system for collecting data relating to the interactive event from audience members in the plurality of theaters, processing the collected data, and communicating with the origination site to broadcast the processed data to the plurality of network theaters during the interactive event;

an interactive communication system for providing two-way audio communication between audience members from multiple sites in the plurality of network theaters and between audience members and the origination site during the interactive event; and an interactive video system for supplying signals containing video information generated from any of the plurality of network theaters and communicating the video information signals to the origination site so that the video information signals can be broadcast to the plurality of network theaters during the interactive event.

13. The interactive theater network system as defined in claim 12 wherein the satellite communication system includes a satellite transmission device located at the origination site and satellite receiving devices located at each of the plurality of network theaters for receiving the interactive event information from the satellite transmission device.

14. The interactive theater network system as defined in claim 13 wherein the satellite communication system includes encryption means for encoding event transmissions so that only authorized network theaters have access to the event transmissions.

15. The interactive theater network system as defined in claim 12 wherein the interactive events include research sessions, business meetings, seminars, multi-media presentations, training, and conferences.

16. The interactive theater network system as defined in claim 12 wherein the data collection system includes wireless keypads provided to theater audience members for generating response data relating to the interactive event information, and RF collection means for receiving RF signals generated by the wireless keypads during data collection.

17. The interactive theater network system as defined in claim 16 wherein the data collection system further includes computer means for receiving the data generated by the audience members, processing the collected data, and communicating the processed data in real-time to the origination site for broadcast to the plurality of network theaters.

18. The interactive theater network system as defined in claim 12 wherein the interactive video system supplies still-image video signals generated from any of the plurality of network theaters and communicated to the origination site.

19. The interactive theater network system as defined in claim 12 wherein the interactive video system supplies full-motion video signals generated from any of the plurality of network theaters and communicated to the origination site.

20. A method of interactively linking a plurality of motion picture theaters to provide a theater network for conducting live, interactive events with theater audiences throughout the theater network, the method comprising:

broadcasting information relating to the interactive event from a network origination site;

providing a plurality of network theater auditoriums each including a full-motion picture projection system configured to receive the interactive event information from the origination site and present the information to theater audiences;

interactively linking the plurality of network theaters and the origination site with a broadcast communication system that communicates the interactive event information from the origination site to the plurality of network theaters;

collecting and processing data relating to the interactive event from audience members in the plurality of network theaters;

communicating the processed data to the origination site for broadcast to the plurality of network theaters during the interactive event;

providing two-way audio communication between audience members from multiple sites in the plurality of network theaters and between audience members and the origination site during the interactive event; and producing signals containing video information from the plurality of network theaters and communicating the video information signals to the origination site so that the video information signals can be broadcast to the plurality of network theaters during the interactive event.

21. The method as defined in claim 20 wherein the broadcast communication system comprises a satellite communication system.

22. The method as defined in claim 21 wherein the satellite communication system includes a satellite transmission device located at the network origination site and satellite receiving devices located at the plurality of network theaters for receiving the interactive event information from the satellite transmission device.

23. The method as defined in claim 22 wherein the satellite communication system includes encryption means for encoding event transmissions so that only authorized network theaters have access to the event transmissions.

24. The method as defined in claim 20 wherein the broadcast communication system transmits information via fiber optic communication or microwave communication.

25. The method as defined in claim 20 wherein the interactive events include research sessions, business meetings, seminars, multi-media presentations, training, and conferences.

26. The method as defined in claim 20 wherein the collecting and processing of data includes providing wireless keypads to theater audience members for generating response data relating to the interactive event information, and providing RF collection means for receiving RF signals generated by the wireless keypads during data collection.

27. The method as defined in claim 26 wherein the collecting and processing of data includes utilizing computer means for receiving the data generated by the audience members, processing the collected data, and communicating the processed data in real-time to the network origination site for broadcast to the plurality of network theaters.

28. The method as defined in claim 20 wherein the video information signals comprise still-image video signals generated from any of the plurality of network theaters and communicated to the network origination site.

29. The method as defined in claim 20 wherein the video information signals comprise full-motion video signals generated from any of the plurality of network theaters and communicated to the network origination site.

30. The interactive theater network system as defined in claim 1 wherein the interactive events include client monitoring and the data collection means further includes computer means for receiving the data generated by the audience members, processing the collected data, and communicating the processed data in substantially instantaneous time to a corporate office location.

31. The interactive theater network system as defined in claim 1 wherein the interactive events include screening motion picture films.

* * * * *